Patented Nov. 12, 1940

2,221,674

UNITED STATES PATENT OFFICE 2,221,674

GLYCOL ESTERS

Carleton Ellis, Montclair, N. J., assignor to Ellis-Foster Company, a corporation of New Jersey No Drawing. Application April 1, 1937,
Serial No. 134,305

3 Claims. (Cl. 260—410)

This invention relates to solid to liquid products derived from saturated fatty acids of non-drying animal or vegetable oils and a reactive oxygenated body such as a polyhydric alcohol or a derivative thereof, as will be more fully hereinafter described.

The non-drying glyceride oils include lard oil, tallow oil, neat's-foot oil, palm kernel oil, coconut oil, and the like. The invention will be illustrated by examples of products prepared with the aid of coconut oil or its fatty acids. It should be understood, however, that other non-drying oils or their fatty acids such as palm kernel oil or its fatty acids, may replace the coconut oil or its fatty acids.

It will be noted that the oil-acids have as a rule 12 carbon atoms, e. g., lauric acid of coconut oil, or higher, e. g., those of various non-drying oils containing 16 or 18 carbon atoms in the fatty acid component. Stearic and other saturated fatty acids of high carbon content are less desirable for present purposes than the fatty acids of intermediate carbon content. For example, when complexes containing a high or influential proportion of stearic acid are admixed with nitrocellulose in solution there is a tendency to form greasy films which is avoided by using saturated or non-drying oil-acids of lower melting point.

Fatty acids of intermediate carbon content include those saturated acids having more than about 4 carbon atoms and less than stearic acid. Lauric acid has 12 carbon atoms.

The aforesaid reactive oxygenated bodies comprise a wide range of substances of differing chemical and physical properties. The following will serve in an illustrative way:

1. Glycerol, in its various forms—dilute, concentrated, crude or refined.
2. Polyglycerols, or a mixture of polyglycerols and glycerol.
3. Various glycols, such as ethylene or propylene glycol.

These may be derived from petroleum gases, by suitable reaction. Mixtures of glycols sometimes obtained from this source may be used to advantage. The employment of glycols in this way is referred to in my copending application Serial No. 61,839, filed Oct. 10, 1925, page 1, now Patent No. 2,072,068.

4. Polyhydric alcohols containing a substituent in the hydroxyl, e. g., mono or dimethyl or propyl ether of glycerol. The mono ethyl ether of ethylene glycol has one hydroxyl free for reactive purposes. The glycerol and the glycol derivatives behave quite differently in the reaction, owing to different polymerizing tendencies and other properties.

5. Glycol ethers (inter-ethers).

The condensation of two or more molecules of a given glycol yields inter-ethers; e. g., two molecules of ethylene glycol condense to dihydroxy diethyl ether, three molecules give the dihydroxy triethyl diether, and so on.

6. Chlorhydrins or other halohydrin.
7. Homologues of ethylene oxide, for example, butylene oxide.

It will be noted that these reactive oxygenated bodies are chemically different as a class from the non-drying glyceride oils and their fatty acids. Physically also they usually are different, e. g., many are water-soluble or hygroscopic substances.

Example 1

| | Parts by weight |
|---|---|
| Diethylene glycol (dihydroxy diethyl monoether) | 80 |
| Fatty acids of coconut oil | 300 |

This mixture was heated in an atmosphere of carbon dioxide at 180–210° C. until the resulting ester had an acid number of 19. The ester was a liquid miscible with alcohol, toluol, mineral spirits and linseed oil. It was compatible with nitrocellulose and also with chlorinated rubber.

Example 2

| | Parts by weight |
|---|---|
| Triethylene glycol (dihydroxy triethyl diether) | 40.3 |
| Fatty acids of coconut oil | 100 |

After heating the above mixture for 6 hours at 180–210° C. in an atmosphere of carbon dioxide, an amber-colored liquid having an acid number of 12.4 resulted. This ester was miscible with mineral spirits, alcohols, linseed oil and glycol.

Example 3

| | Parts by weight |
|---|---|
| Ethylene glycol | 22.9 |
| Fatty acids of coconut oil | 100 |

This mixture was heated for 6 hours at 180–210° C. The resulting product was a light-brown solid of softening point 42° C. and acid number 20.5, which was soluble in isopropyl alcohol, toluol, mineral spirits and linseed oil. It was miscible with glycerol, ethylene glycol and diethylene glycol with the range of equal parts or less of the polyhydric alcohol, the resulting solutions being soft masses suitable for suppository bases, cosmetic creams, textile lubricants and the like. For example, mixed with glycerol in varying proportions compositions of the following softening points were obtained:

| Glycerol | Glycol ester | Softening point |
|---|---|---|
|  |  | ° C. |
| 1 | 0.5 | Incompletely miscible. |
| 1 | 1 | 33 |
| 1 | 2 | 34 |
| 1 | 3 | 36.5 |
| 1 | 4 | 37 |
| 1 | 5 | 40 |

With a white mineral oil (Primol D) soft masses of the following softening points were formed:

| Mineral oil | Glycol ester | Softening point |
|---|---|---|
|  |  | ° C. |
| 1 | 2 | 32 |
| 1 | 3 | 34 |
| 1 | 4 | 35.5 |

*Example 4*

Parts by weight
Diethylene glycol (dihydroxy diethyl monoether) _____ 13.3
Lauric acid _____ 50

A light-colored soft solid of softening point 31° C. and acid number 21.4 resulted after the above mixture had been heated at 180–210° C. for 2½ hours. This product was readily soluble in solvents such as toluol, butyl acetate, isopropyl alcohol, mineral spirits and linseed oil. Miscibility with mono- and diethylene glycol and glycerol occurred when an excess of ester was used. The following shows the softening point of various mixtures with glycerol.

| Glycerol | Ester | Softening point |
|---|---|---|
|  |  | ° C. |
| 1 | 2 | Incompletely miscible |
| 1 | 3 | 26 |
| 1 | 4 | 29 |
| 1 | 5 | 31 |

*Example 5*

Parts by weight
Diethylene glycol ethyl ether _____ 47
Fatty acids of coconut oil _____ 100

The above mixture was heated at 180–210° C. for 5 hours and formed a soft waxy solid of acid number 5.7. This was soluble in the usual lacquer solvents and compatible with nitrocellulose.

The corresponding ester of monoethylene glycol ethyl ether is a liquid.

*Example 6*

Parts by weight
Diethylene glycol _____ 53
Fatty acids of coconut oil _____ 100

These proportions are such as to form the monoester of the glycol. The mixture was heated at 180–210 C. until the acid number was 18.9. The product was an amber-colored liquid, miscible with nitrocellulose.

The proportions of nitrocellulose in coating compositions may be varied considerably with respect ot the products of the present invention. For very hard surface finish the nitrocellulose may predominate but for softer and more flexible coatings the resin or balsam (as the case may be) can be used in relatively high proportion, say from 2 to 10 parts by weight to 1 part of nitrocellulose.

The nitrocellulose used may be of low or high viscosity, but preferably I employ a grade slightly over 1 second and not exceeding 5 seconds viscosity in making lacquers, whereas high viscosity nitrocellulose such as Celluloid, cotton or smokeless powder may be employed with the resin or balsam in making molded products, plastic masses for sheeting to form the tread of felt base floor covering, and for various other purposes.

By employing a non-drying oil fatty acid and especially by reacting the acids of a substantially or relatively saturated glyceride oil such as coconut oil, I reduce the tendency to oxidation changes in a coating on long exposure, and the stabilization thus effected I consider to be of material benefit.

Coconut oil or other animal and vegetable oils embraced herein may be chilled and pressed to secure low cold test grades and either the press cake or the more liquid glycerides employed as a source of the fatty acids. The free fatty acids themselves likewise may be chilled and pressed to secure different grades of varying fluidity.

Generally speaking, I prefer to employ natural glycerides yielding fatty acids which are low in stearic or similar solid fats. In the case of coconut oil, for example, chilling and pressing allow separation into a portion of higher melting point desired in confectionery manufacture, while the more liquid portions may be utilized in making products of the present invention.

In the above examples, therefore, it is understood that cold-test coconut oil or the fatty acids of corresponding titre may be used. The employment of a non-drying substantially oxygen-stable cold-test glyceride oil or its fatty acids constitutes one of the specific forms of the invention.

Either the mixed fatty acids may be used or fractions representing relatively pure constituents although the products may differ somewhat. As shown above, the product obtained with the mixed fatty acids of coconut oil differs in consistency from that obtained with lauric acid itself.

For many purposes, especially in making coating compositions, a low acid number is desirable. There is less tendency to livering with basic pigments and in the case of nitrocellulose lacquers a low acid number is considered safer. Also, if the composition is to be used for insulating purposes low acidity is desirable. A complex which has been extensively reacted so that the acid number is 30 or less thus is preferred. To obtain this relatively low index of acidity is one of the requisites of the preferred form of the present invention.

The distilled fatty acids of animal and vegetable oils also may be used in making the non-siccative complex. Drying or semi-drying oils may be blown to such an extent that they lose siccative properties almost completely. Reactive blown oils or their fatty acids, having substantially non-siccative qualities are included with the raw materials employed in the present invention. These include the blown derivatives of corn, cotton, soya, castor, rape and other vegetable (or animal) oils.

By proceeding in accordance with the foregoing a complex product may be prepared which is soluble in various organic solvents and which may be caused to yield, on saponification, the original acids (as their salts) and the oxygenated body, such as a polyhydric alcohol, in free state.

This application is a continuation in part of Serial 219,562, filed Sept. 14, 1927, now Patent No. 2,089,196.

What I claim is:

1. As new compounds, the diethylene glycol ethyl ether esters of the fatty acids having a carbon content greater than five.

2. As new compounds, the diethylene glycol ethyl ether esters of lauric acid.

3. As new compounds, the diethylene glycol ethyl ether esters of the fatty acids of a non-drying oil.

CARLETON ELLIS.